(12) United States Patent
Bigbee, Jr. et al.

(10) Patent No.: US 8,827,676 B1
(45) Date of Patent: Sep. 9, 2014

(54) APPARATUS AND METHOD FOR EXTRUDING STRIPES ONTO AN EXTRUDED PRODUCT

(75) Inventors: William T. Bigbee, Jr., Melissa, TX (US); Mark Bennett, Ravenna, TX (US)

(73) Assignee: Encore Wire Corporation, McKinney, TX (US)

( * ) Notice: Subject to any disclaimer, the term of this patent is extended or adjusted under 35 U.S.C. 154(b) by 314 days.

(21) Appl. No.: 13/410,490

(22) Filed: Mar. 2, 2012

(51) Int. Cl.
*B29C 47/00* (2006.01)

(52) U.S. Cl.
USPC .................. 425/113; 425/192 R; 425/376.1

(58) Field of Classification Search
CPC .............. B29C 47/025; B29C 47/0828; B29C 47/1081
USPC ................... 425/113, 192 R, 376.1
See application file for complete search history.

(56) References Cited

U.S. PATENT DOCUMENTS

| | | | |
|---|---|---|---|
| 3,076,235 A | 2/1952 | Rollins et al. | |
| 4,182,601 A | 1/1980 | Hill | |
| 4,248,824 A | 2/1981 | Hattop | |
| 4,998,870 A | 3/1991 | Seibert | |
| 6,634,878 B1 | 10/2003 | Yanagawa et al. | |
| 7,754,124 B2 | 7/2010 | Spruell | |
| 7,883,328 B2 | 2/2011 | Lin | |

FOREIGN PATENT DOCUMENTS

GB 950741 2/1964

*Primary Examiner* — James Sanders
(74) *Attorney, Agent, or Firm* — Akin Gump Strauss Hauer & Feld LLP

(57) ABSTRACT

An apparatus for extruding a jacket and/or insulative material onto an extruded product with one or more longitudinal stripes incorporated onto the surface of said extruded product comprising a body, a primary feed conduit for conveying a primary extrusion material, a striping die, a secondary feed conduit for conveying a secondary extrusion material, a striping die adapter, a striping feed conduit extending through the striping die adapter for conveying striping extrusion material. The striping die adapter may also include a thermocouple for maintaining the viscosity of the striping extrusion material and a thermocouple for monitoring the temperature of said striping die adapter. The striping die includes one or more striping extrusion outlets for conveying striping extrusion material onto the extruded product. The striping die may also include a wishbone-shaped trough for delivering equal amounts of striping extrusion material to said extrusion outlets for extrusion onto the product.

12 Claims, 9 Drawing Sheets

FIG. 2

APPARATUS AND METHOD FOR EXTRUDING STRIPES ONTO AN EXTRUDED PRODUCT

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to an apparatus and method for producing extruded products, and particularly to incorporating longitudinal stripes onto extruded products useful in color coding the extruded products for identification, decorative, and other useful purposes.

2. Description of the Related Art

While this invention relates generally to extruded products, for purposes of illustration, references will be made to electrically insulating coatings for cable or wire. However, the invention is applicable to other products such as extruded pipe and other extruded products.

The outer jacket or insulative material of an electric wire or cable is formed by means of extrusion coating. It is well-known that many electrical conducting wires are jacketed and/or insulated with thermoplastic materials such as polyethylene, polyvinyl chloride, or nylon. Such materials may be applied to the surface of a wire by well-known extruding apparatus and methods using an extrusion apparatus designed for this purpose.

Methods and apparatus for producing striped cable are also known in the art. Stripes are often incorporated onto extruded products in order to identify such extruded products. For example, a wire or a cable may be run from one end of a building to another end and different color stripes help to identify the wires at the opposite end and prevent erroneous connections from being made.

Various methods of striping extruded products have been used in the past. For example, an ink striping method applies a stripe of colored ink to wire by means of a wheel running in an ink bath and transferring the ink to the surface of the wire coating, or alternatively, uses a needle running along the surface of the wire through which ink is forced through the needle and onto the coating. Another method of striping involves utilizing multiple extruders containing different colored materials to form a multi-colored or striped coating on the wire. In this method, the separate stripe extruder is often provided for the purpose of extruding one or more stripes on the surface of the jacket or insulating material of the conductor.

The current invention provides many advantages over the prior art. The current invention involves combining the step of extruding stripes onto an extruded product with the step of extruding a jacket and/or insulative materials onto the extruded product. The combination of these two steps eliminates time loss and costly logistics involved in extruding the stripes and the jacket and/or insulative material onto the extruded product in two separate steps. Additionally, the striping extrusion assembly of the current invention is adaptable to an existing extrusion apparatus and can be easily removed and placed onto another existing extrusion apparatus. The portable and exchangeable nature of the striping extrusion assembly provides for versatility and adaptability of the extrusion apparatus.

BRIEF SUMMARY OF THE INVENTION

The present invention provides a method and apparatus for the extrusion of stripes onto extruded products useful in color coding said extruded products for identification, decorative, or other useful purposes.

According to one embodiment of the present invention, an extrusion apparatus provides for the extrusion of a primary extrusion material onto an extruded product, the extrusion of a secondary extrusion material onto an extruded product, and the extrusion of one or more stripes onto the extruded product using a striping die with one or more extrusion chambers therein. The extrusion device may also include a striping die adapter to connect the striping die to the striping extruder for transfer of extrusion material onto the striping die for extrusion onto the extruded product. The striping die adapter may also include a heating element for maintaining the viscosity of the striping extrusion material. The striping die adapter may also include a thermocouple port adapted to a thermostat for monitoring and controlling the temperature of said striping die adapter.

In another embodiment, an apparatus is used for extruding one or more stripes onto the extruded product. The apparatus comprises a striping die with an upstream and downstream side wherein the upstream side of striping die is removably connectable to an apparatus for extruding an outer jacket and/or insulative material onto the extruded product. The apparatus further comprises a striping die adapter with an upstream and downstream side, the upstream side being removably connectable to said downstream side of the striping die. The apparatus may further include a heating element removably connectable to the striping die adapter and a thermocouple port connected to the striping die adapter.

In another embodiment, the extrusion of the extruded product with one or more longitudinal stripes thereon is accomplished by providing a striping die with an upstream and downstream side wherein the upstream side of the striping die is removably connectable to an apparatus for extruding an outer jacket and/or insulative material onto the extruded product. The method further comprises providing a striping die adapter with an upstream and downstream side, the upstream side being removably connectable to the downstream side of the striping die. The method may further include providing a heating element removably connectable to the striping die adapter and a thermocouple port connected to the striping die adapter.

BRIEF DESCRIPTION OF SEVERAL VIEWS OF THE DRAWINGS

A more complete appreciation of the present invention is provided by reference to the following detailed description of the appended drawings and figures. The following description in conjunction with the appended figures enables a person having skill in the art to recognize the numerous advantages and features of the present invention by understanding the various disclosed embodiments. It should be understood, however, the invention is not limited to the precise arrangements in the instrumentality shown. The following figures are utilized to best illustrate these features.

DETAILED DESCRIPTION OF THE INVENTION

The following discussion is presented to enable a person skilled in the art to make and use the present invention. The general principles described herein may be applied to embodiments and applications other than those specifically detailed below without departing from the spirit and scope of the present invention. Therefore, the present invention is not intended to be limited to the embodiments expressly shown, but is to be accorded the widest possible scope of invention consistent with the principles and features disclosed herein.

Figure 1:
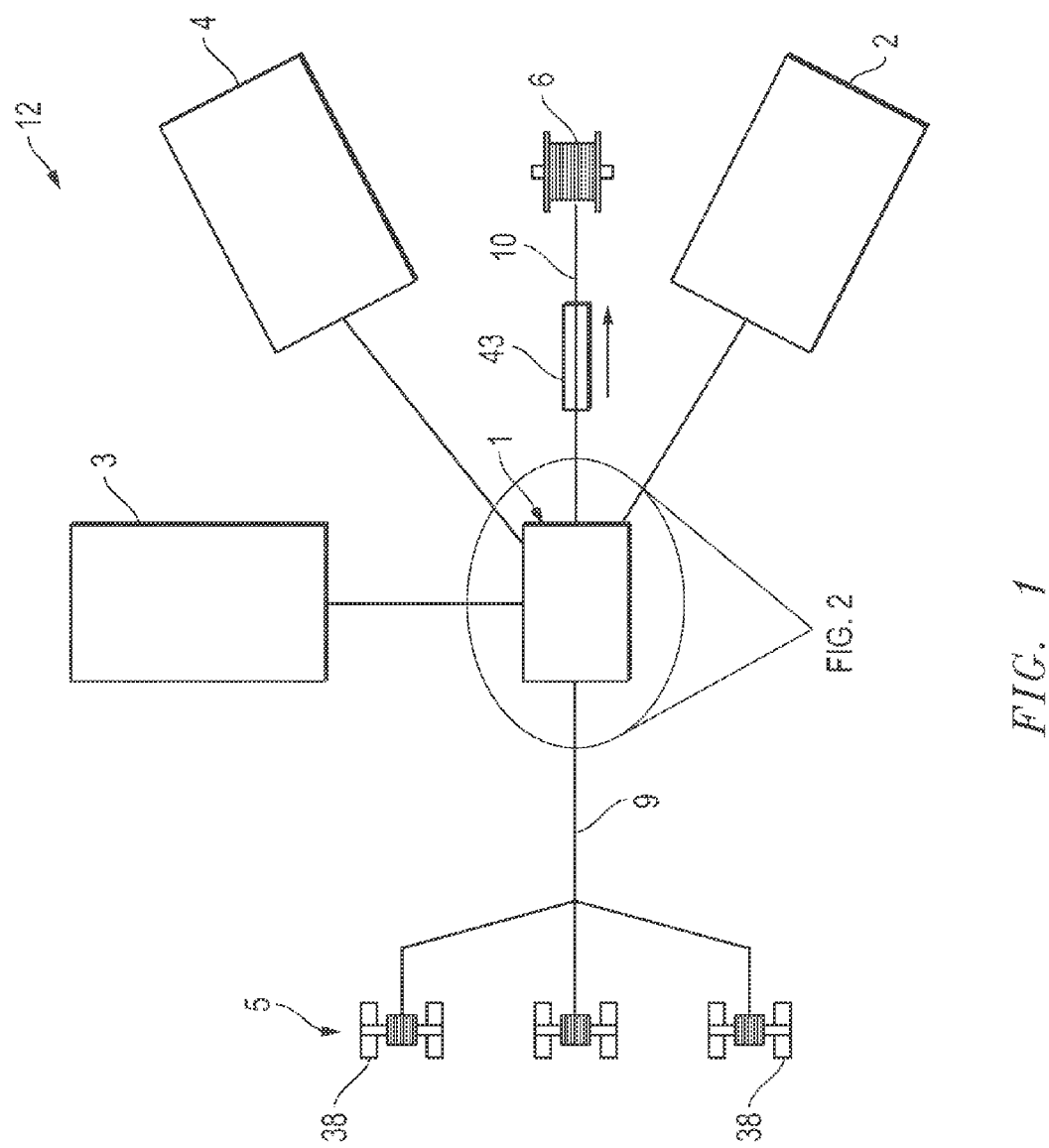
FIG. 1 illustrates an overview of an improved extrusion device.

Referring to FIG. 1, an extrusion device 12 of the present invention is shown. Extrusion device 12 comprises, from upstream to downstream, a payout station 5 (which may comprise multiple payout reels 38), an extrusion station 1, a primary extruder 3, a secondary extruder 4, a striping extruder 2, and a takeup station 6. The payout station 5 may comprise a plurality of payout reels 38 about which is wound a bare conductor or wire 9, e.g., copper wire. From the payout station 5, the bare wire 9 travels to the extrusion station 1, where individual extruders 2, 3, and 4 supply a material such as, but not limited to, a jacket and/or insulating material for coating the extruded product. The material is extruded onto the bare wire 9 passing through the extrusion station 1. The material may be of any suitable jacket or insulating material such as PVC, nylon, or polyethylene. After the bare wire 9 or extruded product 10 is coated with one or more coats of jacket or insulating material, it enters a cooling trough 43 containing water varying in temperature from its upstream end to its downstream end. The temperature of the water in the cooling trough 43 may decrease from upstream to downstream in order to sufficiently cool the extruded product 10.

Figure 2:
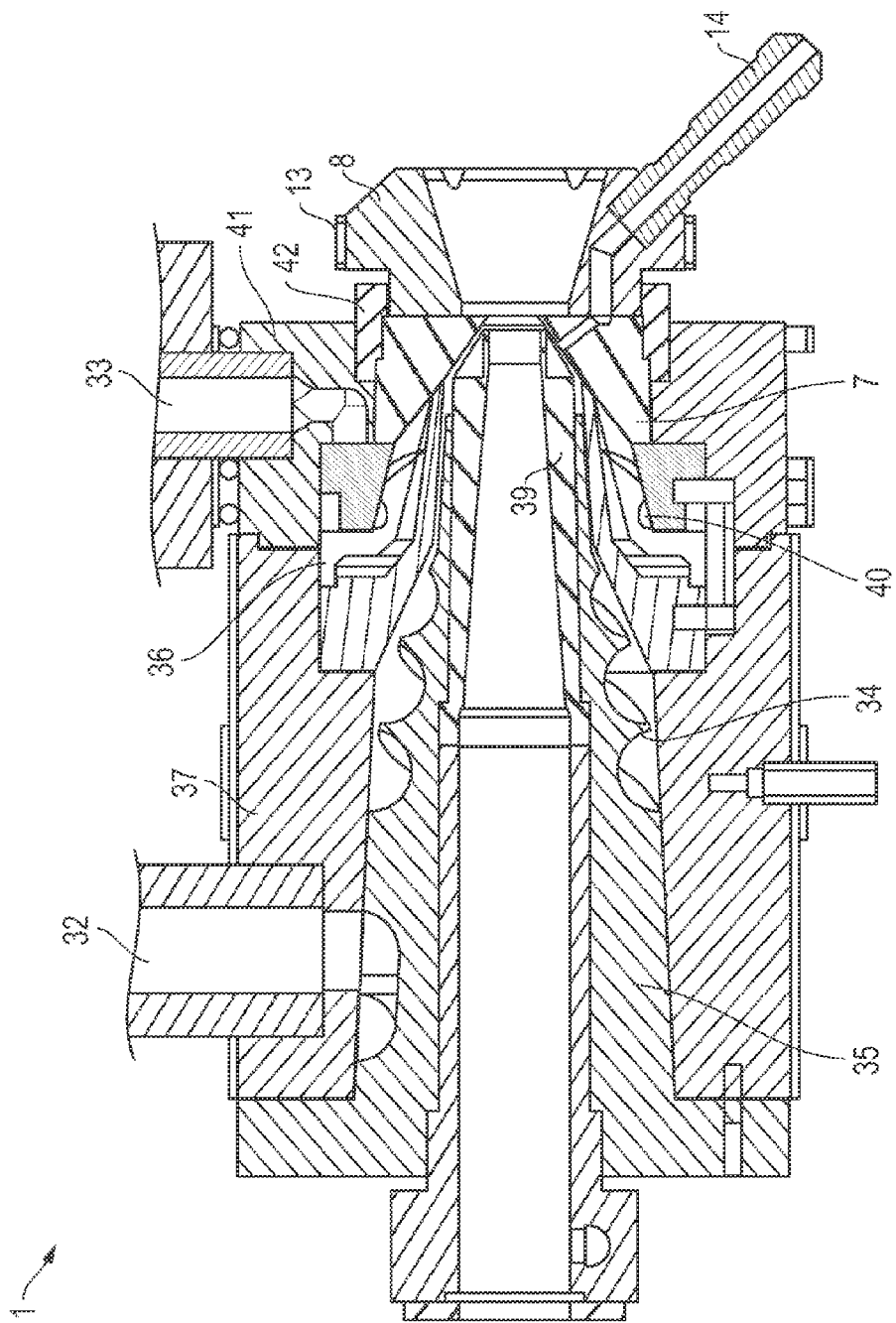
FIG. 2 provides a cross section view of an apparatus for extruding an outer jacket and/or insulative material and one or more longitudinal stripes onto an extruded product according to one aspect of the invention.

Referring to FIG. 2, the extrusion station 1 of the extrusion device 12 is shown. Bare wire 9 is fed into the extrusion station 1 from the payout station 5 (see FIG. 1). A primary feed conduit 32 allows for feeding of a primary extrusion material into a primary extrusion chamber 34 for extrusion onto the bare wire 9 or extruded product 10. A secondary feed conduit 33 is provided for feeding a secondary extrusion material into a secondary extrusion chamber 40 for extrusion onto the bare wire 9 or extruded product 10. The primary extrusion material travels through the primary feed conduit 32 from a primary extruder 3 and into the primary extrusion chamber 34 defined by a primary extrusion head 35, a body 37 and a secondary extrusion head 36. The primary extrusion head 35 may be spiral as shown or any configuration known in the art. As the primary extrusion material emerges from the primary extrusion chamber 34 just downstream of the secondary extrusion chamber 40, it coats the bare wire 9 or extruded product 10 in a uniform manner resulting in an extruded product 10 with a protective jacket or insulative coating around it.

The secondary extrusion material may be either the same material as the primary extrusion material with the exception that it may be pigmented differently to exhibit a different color or it can be selected from materials that are at least compatible with the primary extrusion material. The secondary extrusion material enters the secondary extrusion chamber 40 via the secondary feed conduit 33. The secondary extrusion material contacts and penetrates the stream of the primary extrusion material where the primary extrusion chamber 34 meets the mandrel 39, resulting in the formation of a dual coated extruded product 10 which then passes through a striping die 7 where striping extrusion material contacts and penetrates the secondary extrusion material resulting in the formation of one or more longitudinal stripes of extrusion material on and within the exterior surface of the secondary extrusion material. As the wire 9 passes through the die adapter 8, the end product is formed comprising an extruded product 10 with a jacket and/or insulative coat which includes one or more longitudinal identifying stripes on its outer surface.

Primary extrusion head 35 and secondary extrusion head 36 together with the mandrel 39 and striping die 7 function to direct the flow of fluent extrusion material onto the bare wire 9 to form an extruded wire or product 10 with one or more stripes thereon.

The striping die 7 is removably connectable to an existing extrusion station 1 within a die retainer 41 as more fully disclosed below. The die cap 42 functions to secure the die 7 into the die retainer 41. The striping die adapter 8 is removably connectable to the striping die 7 as shown in FIG. 3 and more fully described below.

Figure 3:
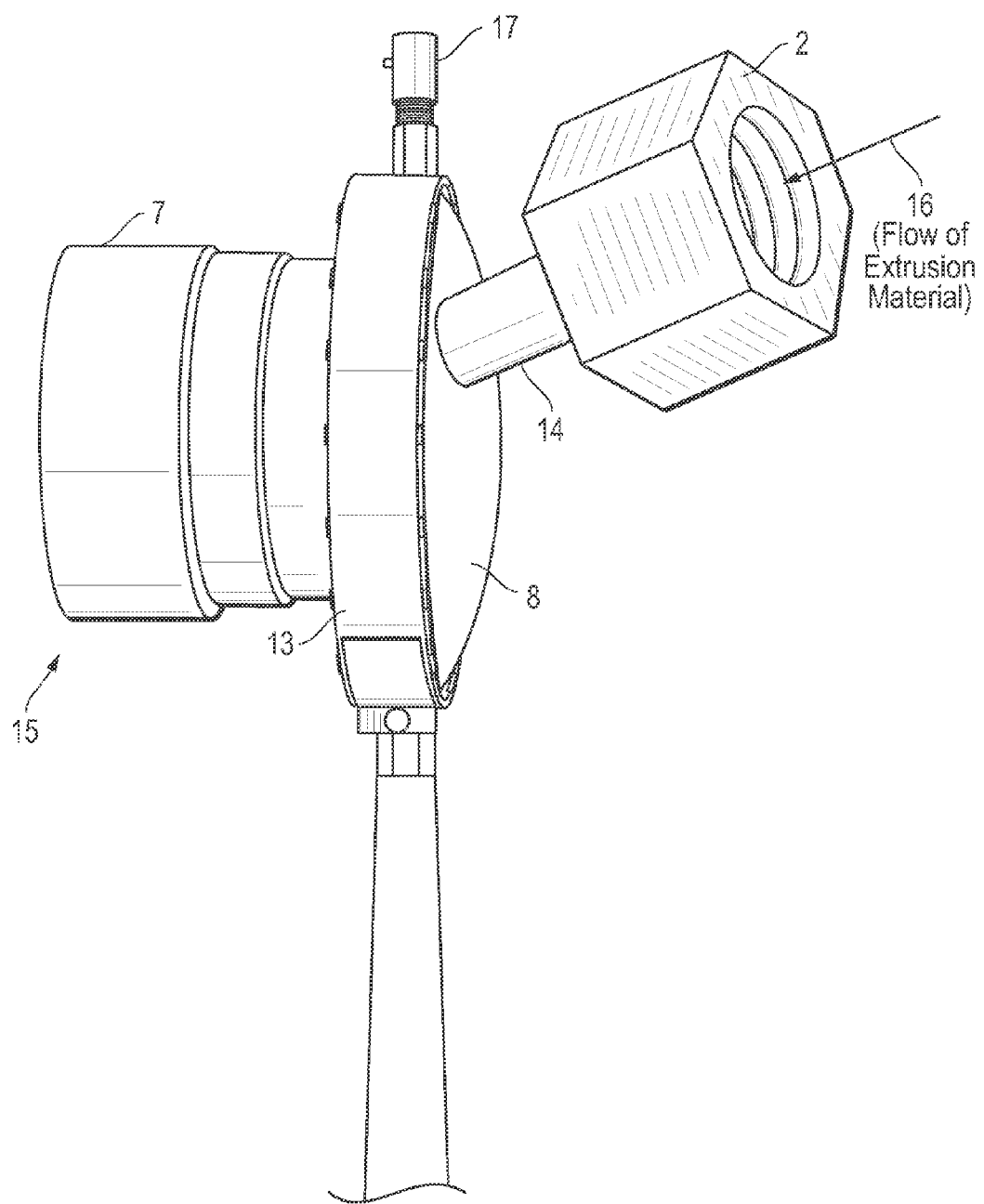
FIG. 3 illustrates a side elevation view of a striping extrusion assembly according to one aspect of the invention.

With reference to FIG. 3, a striping extrusion assembly 15 is shown. The assembly includes the striping die 7, removably attached to the striping die adapter 8, which is threadedly attached to an extruder nipple 14, which is removably attached to the striping extruder 2. The striping die 7, die adapter 8, and nipple 14 may be manufactured using any suitable material such as stainless tool steel. Extrusion material used for extruding one or more stripes on the surface of the extruded product 10 flows through the striping extruder 2 in the direction of the arrow shown 16. The extrusion material travels through the striping extruder 2, to the extrusion nipple 14, into the striping die adapter 8, which is heated by a heating element 13 to maintain the viscosity of the striping material. The striping extrusion material then travels through the striping die 7 (discussed in detail below) onto the extruded product 10 or wire 9. The heating element 13 may be any suitable heating element known to one of skill in the art, but will preferably be made from a flexible material so as to be easily adaptable to the striping die adapter 8. The temperature of the striping die adapter 8 may be monitored and regulated via a thermocouple and thermostat (not shown). The striping die adapter 8 may be equipped with a thermocouple port 17 in which a thermocouple may be removably inserted in order to measure and regulate the temperature of the striping die adapter 8.

Figure 4:
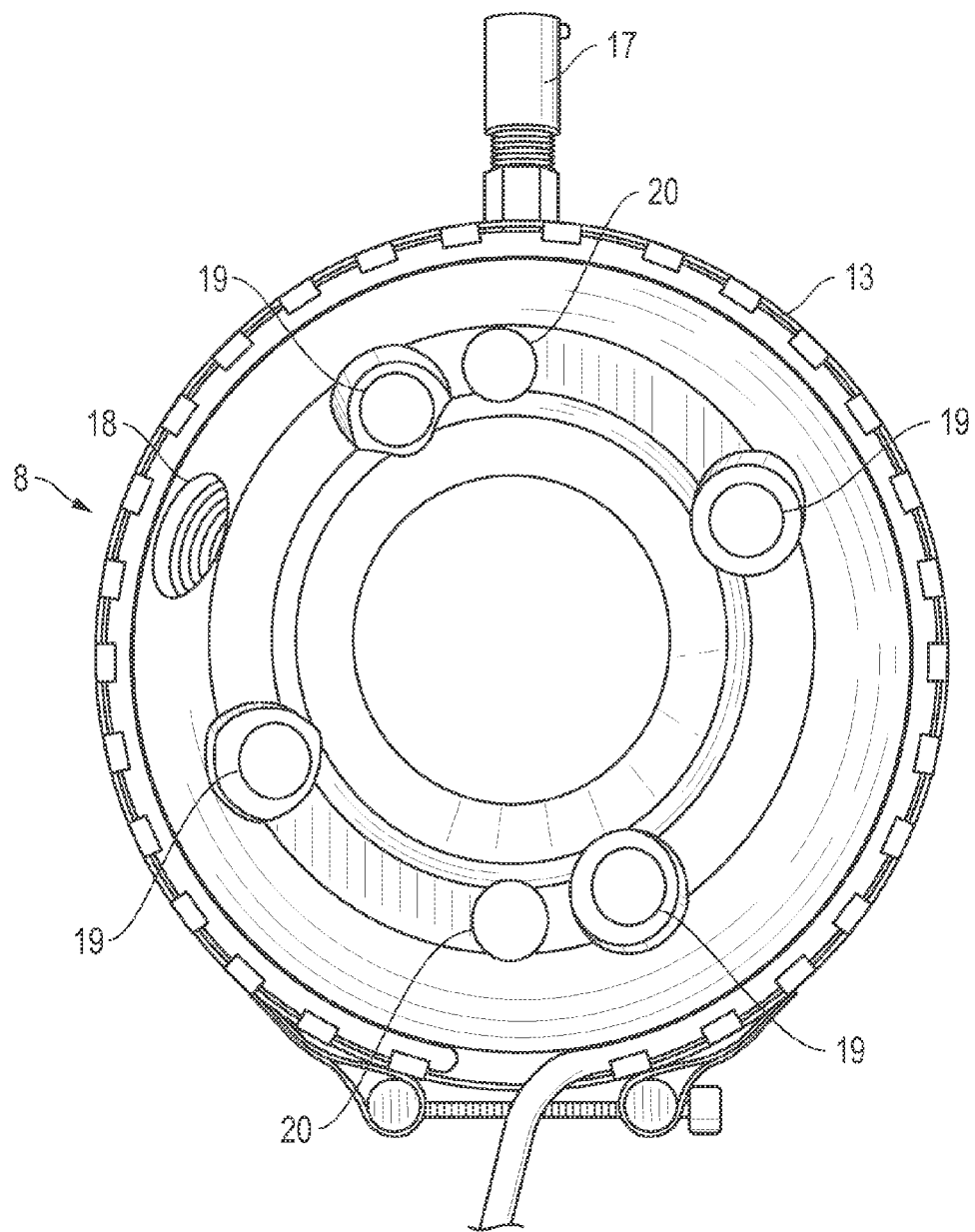
FIG. 4 illustrates a front elevation view of a striping die adapter according to one aspect of the invention.

FIG. 4 shows the front side of the striping die adapter 8, the front side being removably connectable to the striping die 7. The threaded connection 18 of the striping die adapter 8 is used to threadably connect the extruder nipple 14 to the striping die adapter 8. The extruder nipple 14 is then removably connected to the striping extruder 2. The mounting holes 19 may be used to removably connect the striping die adapter 8 and the striping die 7 and to removably connect the striping die 7 to the remainder of the extrusion station 1 as shown in FIG. 2. The demounting holes 20 may be used to separate the striping die adapter 8 from the striping die 7 in the event the two cannot be separated without the use of tools.

Figure 5:
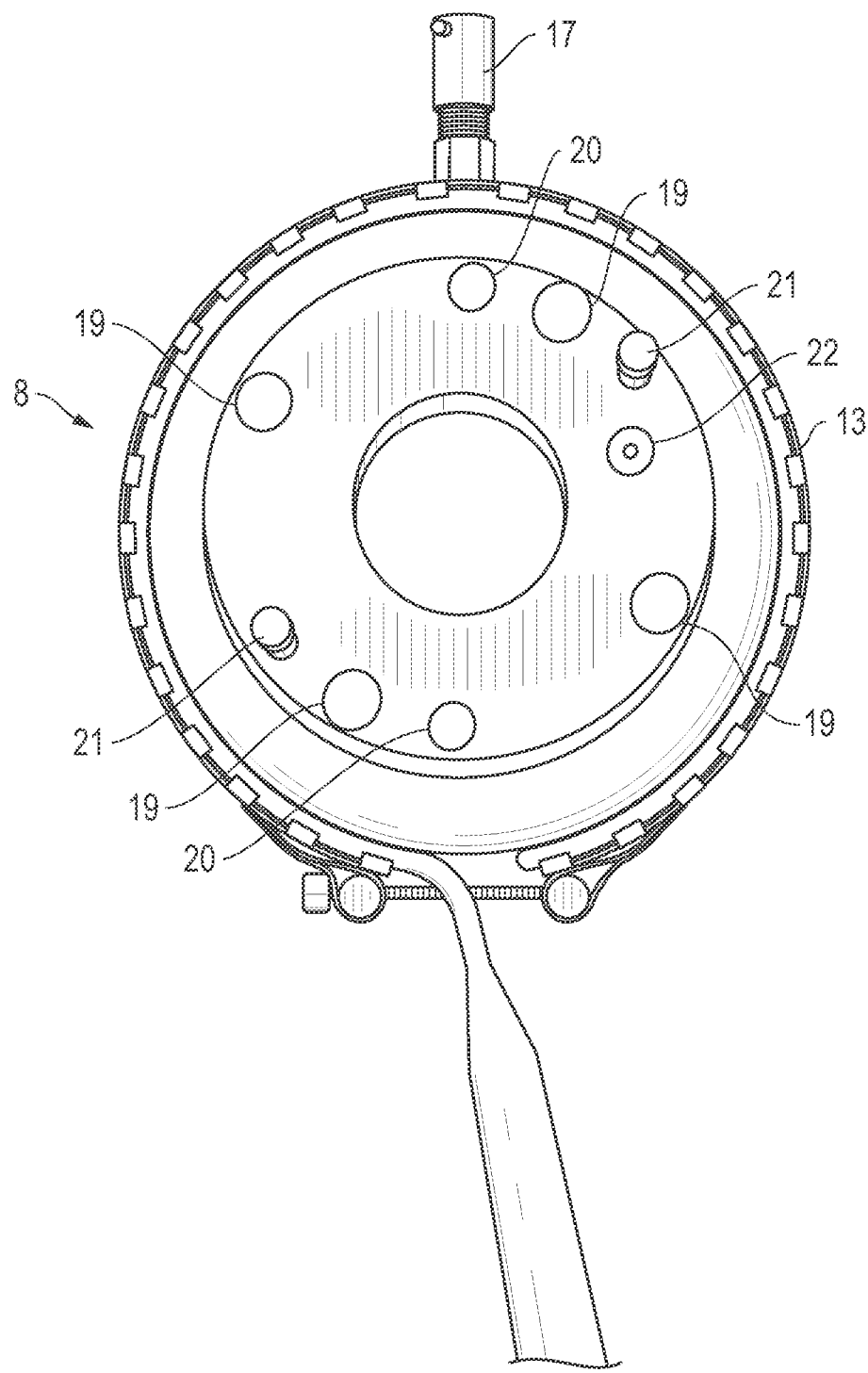
FIG. 5 illustrates a back elevation view of a striping die adapter according to one aspect of the invention.

FIG. 5 is a depiction of the backside of the striping die adapter 8. Dowel pins 21 are used to removably connect the striping die adapter 8 to the front of the striping die 7 (see FIG. 6). The mounting holes 19 again are used to removably connect the striping die adapter 8 to the striping die 7 and to removably connect the striping die 7 to the remainder of the extrusion station 1 as shown in FIG. 2. The demounting holes 20 are used to separate the striping die adapter 8 from the striping die 7 in the event the two cannot be disconnected without the use of tools. The flow of the striping extrusion material flows from the striping extruder 2, to the extruder nipple 14, through the threaded connection 18 in the striping die adapter 8, through an internal chamber (not shown) of the striping die adapter 8 and out the backside of the striping die adapter 8 through the extrusion outlet hole 22 and onto the striping die 7, as more fully discussed below.

Figure 6:
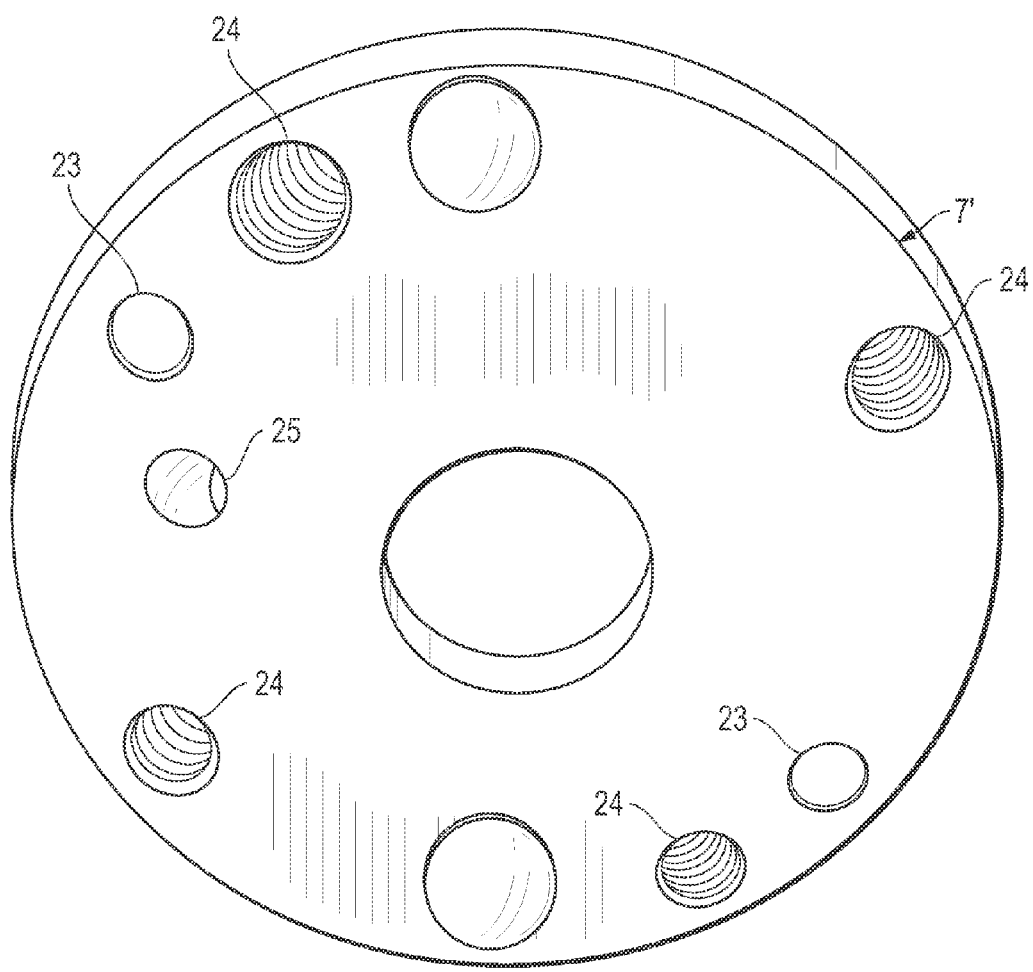
FIG. 6 illustrates a front elevation view of a single striping die according to one aspect of the invention.
Figure 7:
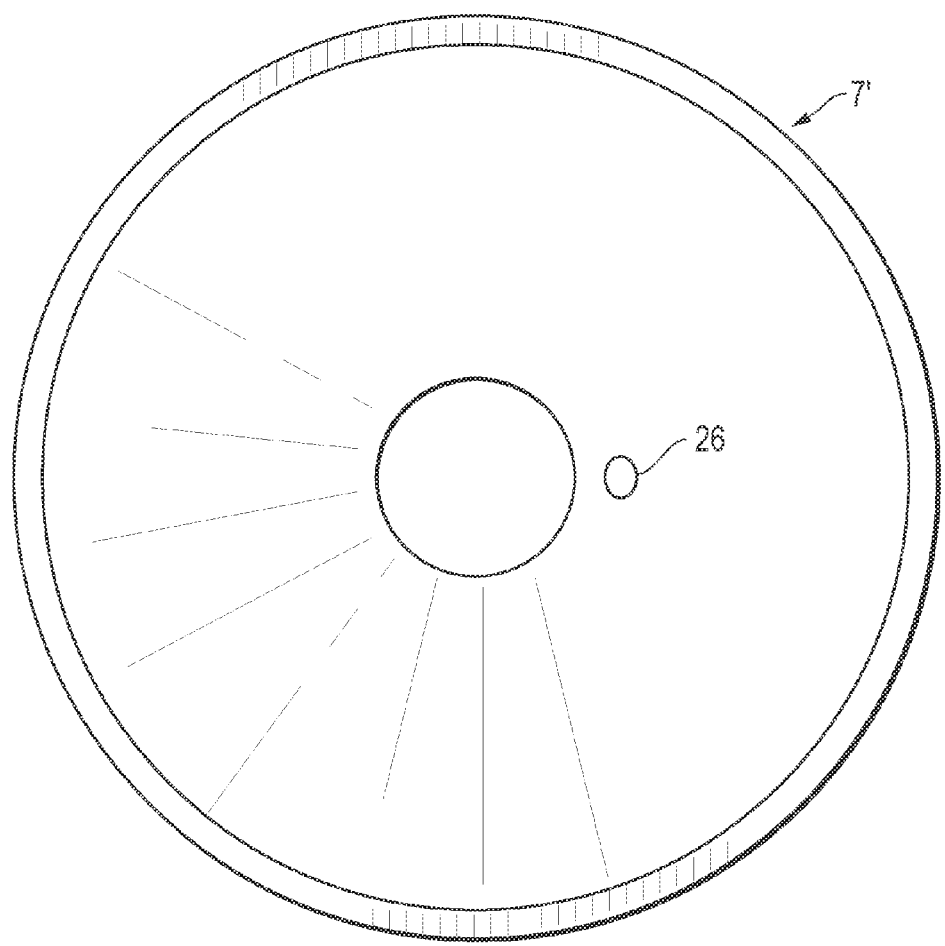
FIG. 7 illustrates a back elevation view of a single striping die according to one aspect of the invention.
Figure 8:
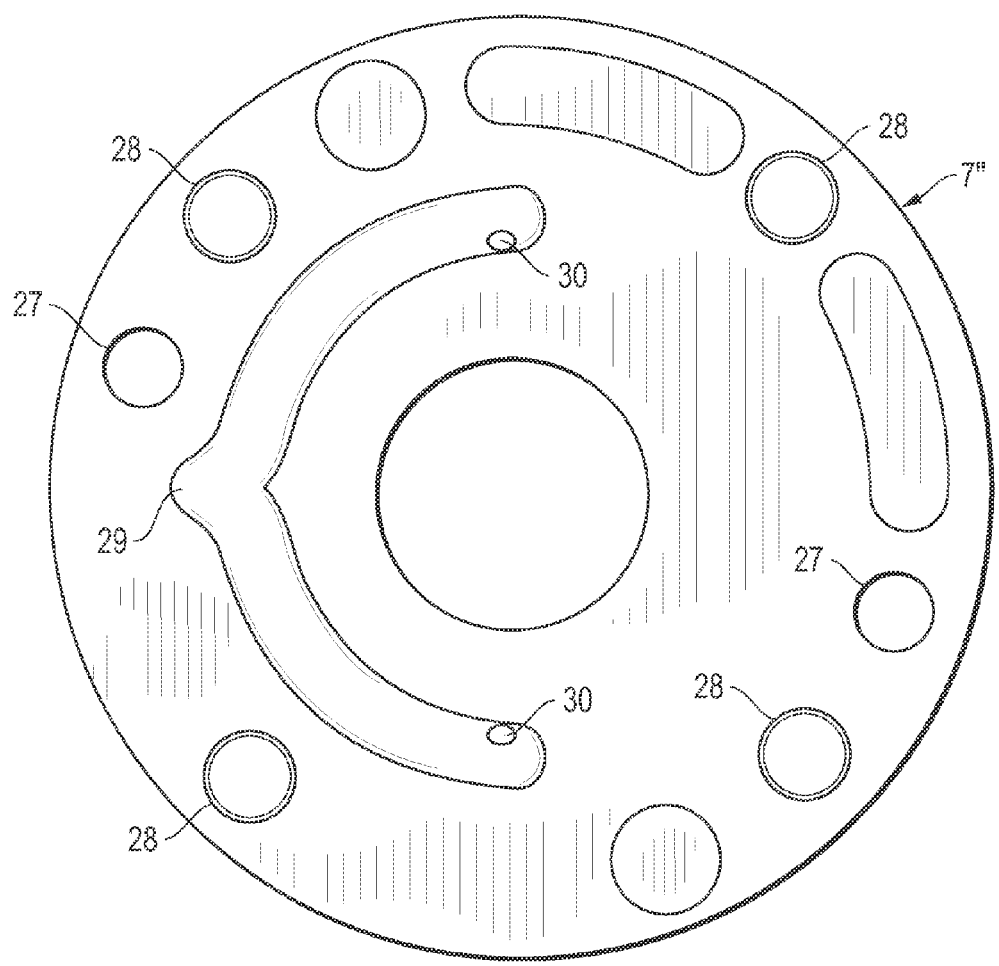
FIG. 8 illustrates a front elevation view of a dual striping die according to one aspect of the invention.
Figure 9:
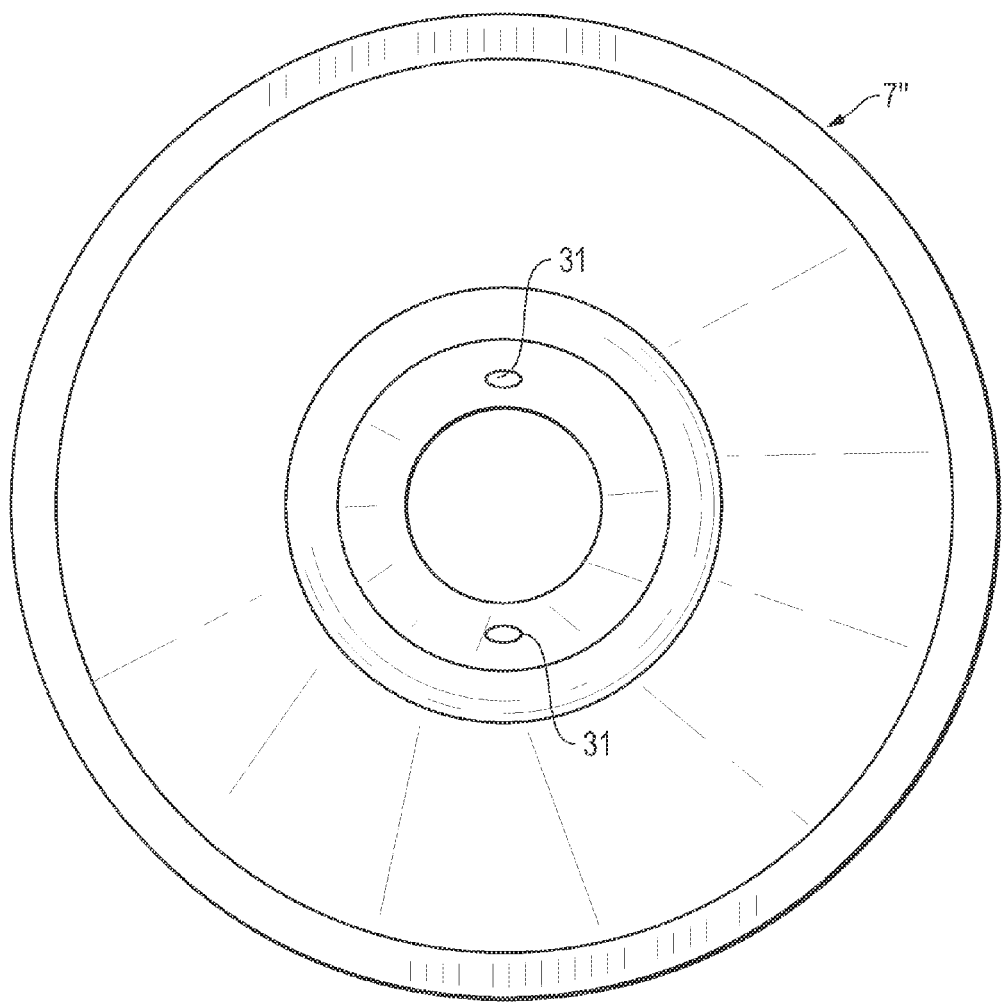
FIG. 9 illustrates a back elevation view of a dual striping die according to one aspect of the invention.

One embodiment of the invention may include a single striping die 7' that extrudes one stripe onto the extruded product 10 or wire 9, and another embodiment of the invention may include extruding two or more stripes onto the extruded product 10 or wire 9. FIGS. 6 and 7 depict the single striping die 7' for extruding a single stripe onto wire 9 or an extruded product 10. FIGS. 8 and 9 depict a double striping die 7" for extruding two or more stripes onto an extruded product 10.

The front side of the single striping die 7' in FIG. 6 is removably attachable to the backside of the striping die adapter 8 shown in FIG. 5. Specifically, the dowel pins 21 of the striping die adapter 8 of FIG. 5 are removably insertable into the dowel pin holes 23 on the front of the single striping die 7' shown in FIG. 6. The mounting holes 24 on the front of the single striping die 7' are used to removably attach the single striping die 7' to the striping die adapter 8 and to the remainder of the extrusion station 1 as shown in FIG. 2. The extrusion outlet hole 22 on the back of the striping die adapter 8 is in flow communication with the extrusion chamber 25 on the front of the single striping die 7'. The striping extrusion material then flows through the extrusion chamber 25 of the single striping die 7' to the outlet 26 on the back of the single striping die 7' shown in FIG. 7 and onto the extruded product 10 or wire 9.

In another embodiment shown in FIGS. 8 and 9, the double striping die 7" provides for the extrusion of two or more stripes onto the extruded product 10 or wire 9. The front side of the double striping die 7" provides two holes 27 for inserting the dowel pins 21 on the back side of the striping die adapter 8. The mounting holes 28 are used to removably attach the double striping die 7" to the striping die adapter 8 and to the remainder of the extrusion station 1 as shown in FIG. 2. The wishbone-shaped flow channel 29 on the front of the dual striping die 7" is in flow communication with the outlet 22 of the striping die adapter 8. The extrusion product flows from the striping die adapter 8 through the outlet 22 onto the wishbone-shaped flow channel 29 on the front of the double striping die 7" and down through the wishbone-shaped flow channel 29 to the extrusion chambers 30 and out of the extrusion outlets 31 on the back side of the double striping die 7" shown in FIG. 9 and onto the extruded product 10 or wire 9. The flow channel 29 functions to evenly distribute the striping extrusion material to two or more extrusion chambers 30 for the extrusion of two or more evenly-distributed stripes onto the extruded product 10 or wire 9.

The striping die adapter 8 may be universally adaptable to various striping dies (i.e., single striping die 7' and double striping die 7").

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:

1. An apparatus for extruding an outer material onto an extruded product with one or more longitudinal stripes incorporated onto the surface of the extruded product comprising:
   a body having a substantially tubular shape, an upstream end and a downstream end;
   a primary feed conduit extending through the body for conveying a primary extrusion material;
   a secondary feed conduit mounted downstream of the primary feed conduit for conveying a secondary extrusion material;
   a primary extrusion head mounted in the body;
   a secondary extrusion head mounted in the body downstream from the primary extrusion head;
   a die retainer mounted to the downstream end of the body;
   a striping die with an upstream side and a downstream side, wherein the striping die is mounted in the die retainer downstream of said secondary extrusion head;
   a striping die adapter removably connectable to the downstream side of said striping die; and
   a striping feed conduit extending through the striping die adapter for conveying striping extrusion material;
   wherein the upstream end of the striping die comprises one or more striping extrusion outlets for delivering striping extrusion material onto the extruded product; the downstream end of the striping die comprises a flow channel in fluid communication with the one or more striping extrusion outlets; and the flow channel is wishbone-shaped.

2. The apparatus of claim 1 further comprising:
   a heating element removably connectable to the striping die adapter.

3. The apparatus of claim 1 further comprising:
   a thermocouple port mounted to the striping die adapter.

4. An apparatus for extruding an outer material onto an extruded product with one or more longitudinal stripes incorporated onto the surface of the extruded product comprising:
   a primary feed conduit supplying a primary extrusion material through a primary extrusion chamber to coat the extruded product;
   a secondary feed conduit supplying a secondary extrusion material through a secondary extrusion chamber to coat the extruded product;
   a striping feed conduit supplying a striping extrusion material onto a striping die, wherein the striping die comprises an upstream side and a downstream side; and
   a striping die adapter for establishing a fluid connection between the striping feed conduit and the striping die; wherein the upstream end of the striping die comprises one or more striping extrusion outlets for delivering striping extrusion material onto the extruded product; the downstream end of the striping die comprises a flow channel in fluid communication with the one or more striping extrusion outlets; and the flow channel is wishbone-shaped.

5. The apparatus of claim 4 further comprising:
a heating element removably connectable to the striping die adapter.

6. The apparatus of claim 4 further comprising:
a thermocouple port mounted to the striping die adapter.

7. An apparatus for extruding one or more stripes onto an extruded product comprising:
a striping die with an upstream side and a downstream side, wherein the upstream side of the striping die is removably connectable to an apparatus for extruding an outer jacket or insulative material onto the extruded product; and
a striping die adapter with an upstream side and a downstream side, wherein the upstream side of the striping die adapter is removably connectable to the downstream side of the striping die; wherein the striping die comprises one or more striping extrusion outlets for delivering striping extrusion material onto the extruded product; the striping die comprises a flow channel in fluid communication with the one or more striping extrusion outlets; and the flow channel is wishbone-shaped.

8. The apparatus of claim 7 further comprising:
a heating element removably connectable to the striping die adapter.

9. The apparatus of claim 7 further comprising:
a thermocouple port mounted to the striping die adapter.

10. An apparatus for extruding one or more stripes onto an extruded product comprising:
a striping die, wherein the striping die is removably connectable to an apparatus for extruding an outer jacket or insulative material onto the extruded product; and
a striping die adapter removably connectable to the striping die; wherein the striping die comprises one or more striping extrusion outlets for delivering striping extrusion material onto the extruded product; the striping die comprises a flow channel in fluid communication with the one or more striping extrusion outlets; and the flow channel is wishbone-shaped.

11. The apparatus of claim 10 further comprising:
a heating element removably connectable to the striping die adapter.

12. The apparatus of claim 10 further comprising:
a thermocouple port mounted to the striping die adapter.

* * * * *